(12) United States Patent
Lee et al.

(10) Patent No.: US 11,923,146 B2
(45) Date of Patent: Mar. 5, 2024

(54) MULTILAYER CERAMIC CAPACITOR AND METHOD OF MANUFACTURING THE SAME

(71) Applicant: SAMSUNG ELECTRO-MECHANICS CO., LTD., Suwon-si (KR)

(72) Inventors: Eun Jung Lee, Suwon-si (KR); Jong Ho Lee, Suwon-si (KR); Sim Chung Kang, Suwon-si (KR); Ki Pyo Hong, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

(21) Appl. No.: 18/139,007

(22) Filed: Apr. 25, 2023

(65) Prior Publication Data

US 2023/0260704 A1 Aug. 17, 2023

Related U.S. Application Data

(63) Continuation of application No. 17/586,322, filed on Jan. 27, 2022, now Pat. No. 11,670,454, which is a (Continued)

(30) Foreign Application Priority Data

Sep. 10, 2019 (KR) .................. 10-2019-0112304

(51) Int. Cl.
*H01G 4/12* (2006.01)
*H01G 4/012* (2006.01)
(Continued)

(52) U.S. Cl.
CPC .......... *H01G 4/1227* (2013.01); *H01G 4/012* (2013.01); *H01G 4/248* (2013.01); *H01G 4/30* (2013.01)

(58) Field of Classification Search
CPC ........ H01G 4/012; H01G 4/1227; H01G 4/33; H01G 4/248; H01G 4/30; H01G 4/008; H01G 4/2325
See application file for complete search history.

(56) References Cited

U.S. PATENT DOCUMENTS

| 11,270,844 B2 * | 3/2022 | Lee ...................... H01G 4/30 |
| 2007/0253140 A1 * | 11/2007 | Randall ................ H01G 4/30 361/300 |

(Continued)

FOREIGN PATENT DOCUMENTS

| CN | 102751092 A | 10/2012 |
| CN | 106977194 A | 7/2017 |

(Continued)

OTHER PUBLICATIONS

Korean Office Action dated Nov. 6, 2020 issued in Korean Patent Application No. 10-2019-0112304 (with English translation).
(Continued)

*Primary Examiner* — Michael P McFadden
(74) *Attorney, Agent, or Firm* — Morgan, Lewis & Bockius LLP

(57) ABSTRACT

A multilayer ceramic capacitor includes a ceramic body having a dielectric layer, a plurality of internal electrodes disposed in the ceramic body, and a first side margin portion and a second side margin portion arranged on end portions of the internal electrodes exposed through respective opposing surfaces of the ceramic body. The ceramic body includes an active portion having the plurality of internal electrodes arranged to overlap each other with the dielectric layer interposed therebetween to form capacitance, and cover portions disposed above an uppermost and below a lowermost internal electrode of the active portion. The first and second side margin portions include tin (Sn), and a content (Continued)

of Sn included in the first and second side margin portions is greater than a content of Sn included in the dielectric layer of the active portion.

12 Claims, 12 Drawing Sheets

Related U.S. Application Data continuation of application No. 16/824,903, filed on Mar. 20, 2020, now Pat. No. 11,270,844.

(51) Int. Cl.
  *H01G 4/248* (2006.01)
  *H01G 4/30* (2006.01)

(56) References Cited

U.S. PATENT DOCUMENTS

| | | |
|---|---|---|
| 2010/0195266 A1 | 8/2010 | Morita et al. |
| 2012/0262840 A1 | 10/2012 | Koizumi |
| 2014/0185184 A1 | 7/2014 | Okajima et al. |
| 2014/0268402 A1 | 9/2014 | Jeong |
| 2014/0268492 A1* | 9/2014 | Jeong .................. C04B 35/4682 501/137 |
| 2014/0301013 A1 | 10/2014 | Kim |
| 2015/0340156 A1 | 11/2015 | Masunari et al. |
| 2016/0196918 A1 | 7/2016 | Hong et al. |
| 2017/0018363 A1 | 1/2017 | Tanaka et al. |
| 2017/0169952 A1* | 6/2017 | Kato .................... H01G 4/2325 |
| 2017/0178808 A1 | 6/2017 | Shimada et al. |
| 2017/0178812 A1 | 6/2017 | Shimada |
| 2018/0204678 A1 | 7/2018 | Yamaguchi |
| 2018/0261390 A1 | 9/2018 | Sakate et al. |
| 2019/0006105 A1* | 1/2019 | Kato .................... H01G 4/2325 |

FOREIGN PATENT DOCUMENTS

| | | |
|---|---|---|
| JP | S60-161338 A | 8/1985 |
| JP | H06-166518 A | 6/1994 |
| JP | 2010-173910 A | 8/2010 |
| JP | 2014-143392 A | 8/2014 |
| JP | 2014-204117 A | 10/2014 |
| JP | 2017-028013 A | 2/2017 |
| JP | 2017-109904 A | 6/2017 |
| JP | 2018-117051 A | 7/2018 |
| JP | 2016-160166 A | 9/2018 |
| JP | 2018-148118 A | 9/2018 |
| KR | 10-2015-0135092 A | 12/2015 |
| KR | 10-2016-0084614 A | 7/2016 |

OTHER PUBLICATIONS

Office Action issued in corresponding Japanese Patent Application No. 2020-066316 dated Nov. 2, 2021 (with English translation).
Chinese Office Action dated Nov. 12, 2021 issued in Chinese Patent Application No. 202010518419.1 (with English translation).
U.S. Notice of Allowance dated Nov. 3, 2021 issued in U.S. Appl. No. 16/824,903.
U.S. Notice of Allowance dated Feb. 9, 2023 issued in U.S. Appl. No. 17/586,322.
U.S. Non-Final Office Action dated Nov. 11, 2022 issued in U.S. Appl. No. 17/586,322.
Japanese Office Action dated Jun. 14, 2022 issued in Japanese Patent Application No. 2020-066316 (with English translation).

* cited by examiner

MULTILAYER CERAMIC CAPACITOR AND METHOD OF MANUFACTURING THE SAME

CROSS-REFERENCE TO RELATED APPLICATION

This application is a continuation of U.S. patent application Ser. No. 17/586,322, filed on Jan. 27, 2022, which is a continuation of U.S. patent application Ser. No. 16/824,903, filed on Mar. 20, 2020, now U.S. Pat. No. 11,270,844, issued on Mar. 8, 2022, which claims benefit of priority to Korean Patent Application No. 10-2019-0112304, filed on Sep. 10, 2019, the disclosures of which are incorporated herein by reference in their entireties.

BACKGROUND

1. Field

The present disclosure relates to a multilayer ceramic capacitor having improved reliability, and a method of manufacturing the same.

2. Description of Related Art

In general, an electronic component using a ceramic material such as a capacitor, an inductor, a piezoelectric element, a varistor, a thermistor, or the like, may include a ceramic body made of a ceramic material, an internal electrode formed in the body, and an external electrode provided on a surface of the ceramic body to be connected to the internal electrode.

It is a recent trend that chip components become miniaturized and multi-functionalized as electronic products are miniaturized and multi-functionalized. Accordingly, there is demand for multilayer ceramic capacitors to be miniaturized and to have high capacitance.

In order to make the multilayer ceramic capacitors small in size and high in capacitance, it may be necessary to maximize an effective area of the electrode and/or increase an effective volume fraction contributing to capacitance.

To accomplish a miniaturized and high capacitance multilayer ceramic capacitor, a method employing exposing the internal electrodes in the width direction of the body to maximize an area of the internal electrodes in the width direction through a design without a margin portion, and separately attaching a side margin portion to the exposed surfaces of the internal electrodes in the width direction of the chip during pre-sintering, after chip preparation, has been applied when manufacturing the multilayer ceramic capacitor.

In the case of the above method, however, a thickness and an area of the side margin portion are reduced, which increases risks of breakage and cracks due to external impacts.

Therefore, there is a need for applications of ceramic materials capable of improving impact resistance and crack resistance to miniaturized and high capacitance products.

SUMMARY

An aspect of the present disclosure is to provide a multilayer ceramic capacitor having improved reliability, and a method of manufacturing the same.

According to an aspect of the present disclosure, a multilayer ceramic capacitor includes a ceramic body including a dielectric layer, and a first surface and a second surface opposing each other, a third surface and a fourth surface connecting the first and second surfaces, and a fifth surface and a sixth surface connected to the first to fourth surfaces and opposing each other. A plurality of internal electrodes are disposed in the ceramic body, are exposed on the first and second surfaces, and each have one end exposed through one of the third surface or the fourth surface. A first side margin portion and a second side margin portion are arranged on end portions of the internal electrodes exposed through the first and second surfaces, respectively. The ceramic body includes an active portion including the plurality of internal electrodes arranged to overlap each other with the dielectric layer interposed therebetween to form capacitance, and cover portions disposed above an uppermost internal electrode and below a lowermost internal electrode of the active portion. The first and second side margin portions include tin (Sn), and a content of Sn included in the first and second side margin portions is greater than a content of tin (Sn) included in the dielectric layer of the active portion.

According to another aspect of the present disclosure, a method of manufacturing a multilayer ceramic capacitor includes preparing a first ceramic green sheet having a plurality of first internal electrode patterns formed at a predetermined interval, and a second ceramic green sheet having a plurality of second internal electrode patterns formed at a predetermined interval, the first and second ceramic green sheets having a first content of tin (Sn). A laminated body is formed by laminating the first ceramic green sheet and the second ceramic green sheet such that the first internal electrode patterns and the second internal electrode patterns overlap each other. The laminated body is cut so as to have side surfaces opposing each other in a width direction and to which the first internal electrode patterns and the second internal electrode patterns are exposed, and a first side margin portion and a second side margin portion are respectively formed on the side surfaces opposing each other in the width direction, the first and second side margin portions having a second content of tin (Sn) higher than the first content. The cut laminated body is sintered to prepare a ceramic body having first and second internal electrodes overlapping each other with a dielectric layer therebetween.

According to another aspect of the present disclosure, a multilayer ceramic capacitor includes a ceramic body including pluralities of first internal electrodes and second internal electrodes that are alternately stacked to overlap with each other with dielectric layers interposed therebetween, and first and second external electrodes disposed on one or more external surfaces of the ceramic body and respectively connected to the plurality of first internal electrodes and the plurality of second internal electrodes. A content of tin (Sn) in a region of the ceramic body between an external surface of the ceramic body and the first and second internal electrodes is different from a content of tin (Sn) in the dielectric layers interposed between overlapping first and second internal electrodes.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
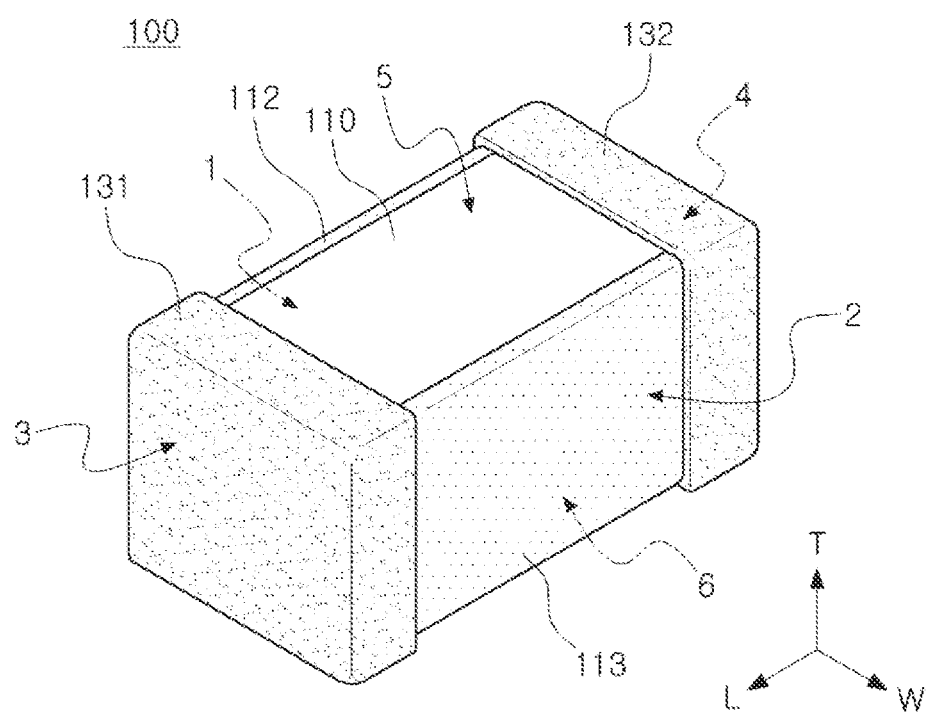
FIG. 1 is a schematic perspective view illustrating a multilayer ceramic capacitor according to an exemplary embodiment of the present disclosure.

Hereinafter, preferred embodiments of the present disclosure will be described with reference to the accompanying drawings. Exemplary embodiments of the present disclosure may be modified into various other forms, and the scope of the present disclosure is not limited to the embodiments described below. Exemplary embodiments of the present disclosure may be also provided to more fully describe the present disclosure to those skilled in the art. Therefore, the shapes and sizes of the elements in the drawings may be exaggerated for clarity, and the elements denoted by the same reference numerals in the drawings are the same elements.

FIG. 1 is a schematic perspective view illustrating a multilayer ceramic capacitor according to an exemplary embodiment of the present disclosure.

Figure 2:
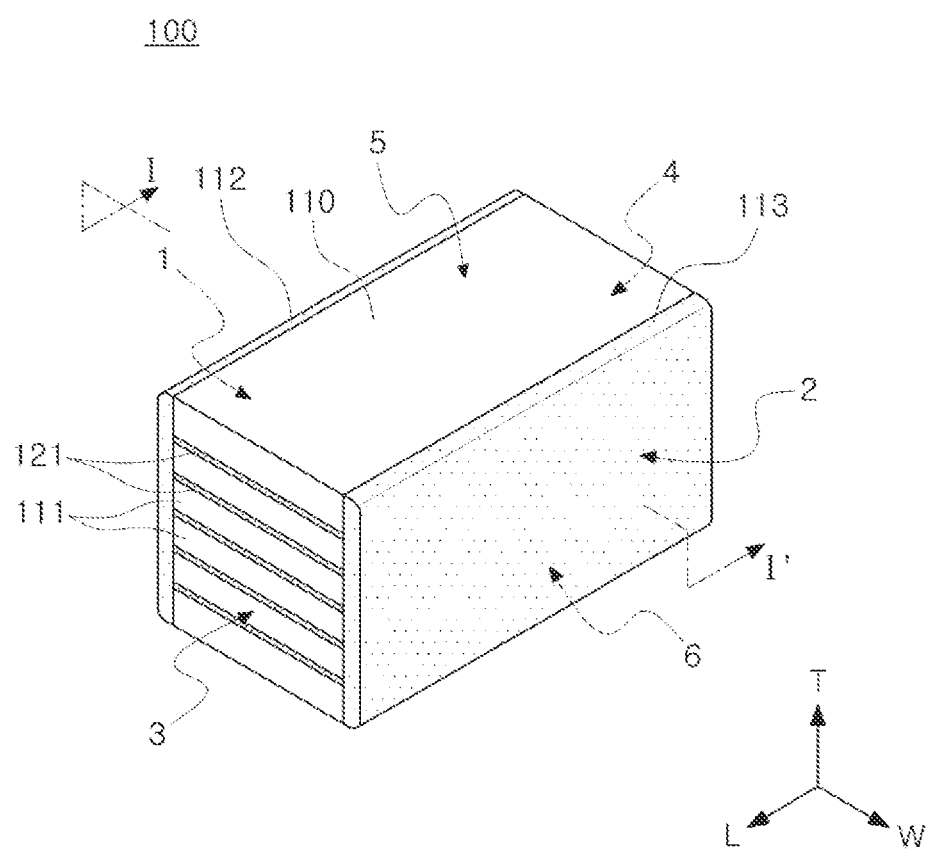
FIG. 2 is a perspective view illustrating an exterior of the ceramic body of FIG. 1.

FIG. 2 is a perspective view illustrating an appearance of the ceramic body of FIG. 1.

Figure 3:
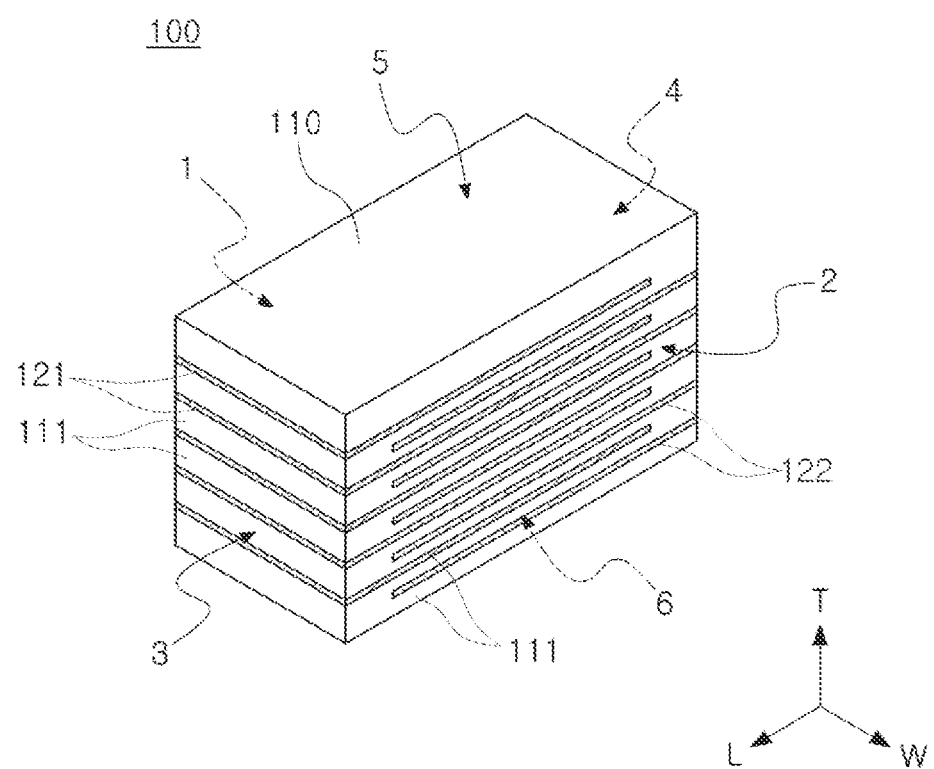
FIG. 3 is a perspective view illustrating a ceramic green sheet laminated body of the ceramic body of FIG. 2, prior to a sintering operation.

FIG. 3 is a perspective view illustrating a ceramic green sheet laminated body of the ceramic body of FIG. 2, prior to a sintering operation.

Figure 4:
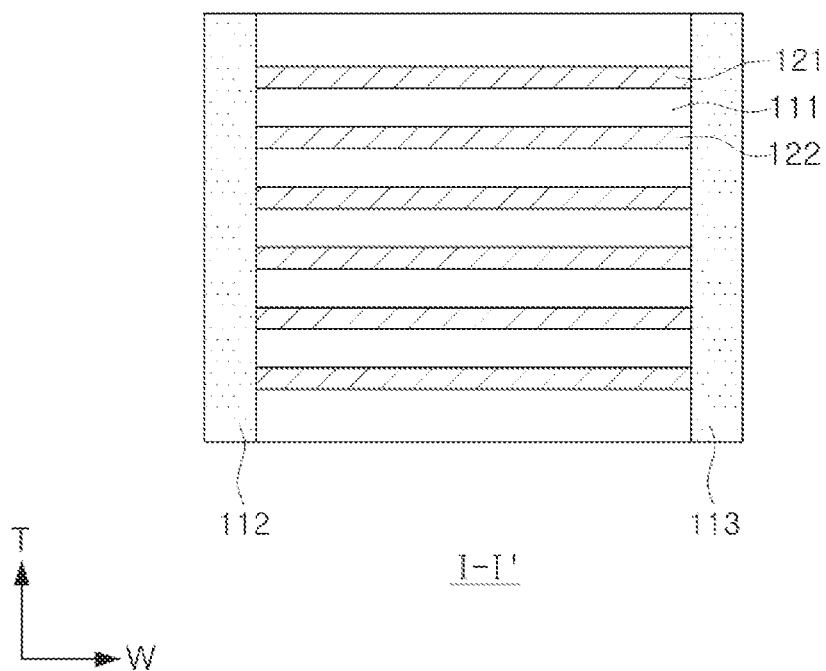
FIG. 4 is a cross-sectional view taken along line I-I' of FIG. 2.

FIG. 4 is a cross-sectional view taken along line I-I' of FIG. 2.

Referring to FIGS. 1 to 4, a multilayer ceramic capacitor 100 according to an exemplary embodiment may include a ceramic body 110, a plurality of internal electrodes 121 and 122 formed in the ceramic body 110, and external electrodes 131 and 132 formed on one or more external surface(s) of the ceramic body 110.

The ceramic body 110 may have a first surface 1 and a second surface 2 opposing each other, a third surface 3 and a fourth surface 4 opposing each other and connecting the first surface and the second surface, and a fifth surface 5 and a sixth surface 6, which are an upper surface and a lower surface of the ceramic body 110.

The first surface 1 and the second surface 2 may be defined as surfaces opposing each other in a width direction of the ceramic body 110, the third surface 3 and the fourth surface 4 may be defined as surfaces opposing each other in a longitudinal or length direction, and the fifth surface 5 and the sixth surface 6 may be defined as surfaces opposing each other in a thickness direction.

A shape of the ceramic body 110 is not particularly limited, but may be a rectangular parallelepiped shape as illustrated in the drawings.

The plurality of the internal electrodes 121 and 122 formed in the ceramic body 110 may each have one end exposed through the third surface 3 or the fourth surface 4 of the ceramic body.

The internal electrodes 121 and 122 may have a first internal electrode 121 and a second internal electrode 122, having different polarities, provided in pairs.

One end of each first internal electrode 121 may be exposed through the third surface 3, and one end of each second internal electrode 122 may be exposed through the fourth surface 4.

The other ends of the first internal electrodes 121 and the second internal electrodes 122 (e.g., the ends thereof disposed opposite to the one end) may be formed to be spaced apart from the fourth surface 4 and the third surface 3, respectively, at regular intervals.

A first external electrode 131 may be formed on the third surface 3 of the ceramic body to be electrically connected to the first internal electrode(s) 121. A second external electrode 132 may be formed on the fourth surface 4 of the ceramic body to be electrically connected to the second internal electrode(s) 122.

A multilayer ceramic capacitor 100 according to an exemplary embodiment of the present disclosure may include a plurality of internal electrodes 121 and 122 disposed in the ceramic body 110, each exposed through the first and second surfaces 1 and 2, and each having one end exposed through the third surface 3 or the fourth surface 4; and a first side margin portion 112 and a second side margin portion 113 respectively arranged on end portions of the internal electrodes 121 and 122 exposed through the first and second surfaces 1 and 2, respectively.

A plurality of the internal electrodes 121 and 122 may be formed in the ceramic body 110. Ends of each of a plurality of the internal electrodes 121 and 122 may be exposed through the first and second surfaces 1 and 2, which are surfaces opposite each other in the width direction of the ceramic body 110, and the first side margin portion 112 and the second side margin portion 113 may be arranged on the exposed end portions, respectively.

An average thickness of each of the first side margin portion 112 and the second side margin portion 113 may be 2 μm to 15 μm.

According to an exemplary embodiment of the present disclosure, the ceramic body 110 may include a laminated body in which a plurality of dielectric layers 111 are laminated, and a first side margin portion 112 and a second side margin portion 113 respectively arranged on both side surfaces of the laminated body.

A plurality of the dielectric layers 111 may be in a sintered state, and boundaries between neighboring dielectric layers may be unified to a degree not capable of being confirmed with the naked eye.

A length of the ceramic body 110 may correspond to a distance from the third surface 3 to the fourth surface 4 of the ceramic body.

A length of the dielectric layer 111 may correspond to a space between the third surface 3 and the fourth surface 4 of the ceramic body.

According to an exemplary embodiment of the present disclosure, the length of the ceramic body may be 400 μm to 1400 μm. In particular, the length of the ceramic body may be 400 μm to 800 μm or 600 μm to 1400 μm.

The internal electrodes 121 and 122 may be formed on the dielectric layers 111, and the internal electrodes 121 and 122 may be formed in the ceramic body 110 with a single dielectric layer 111 interposed between each adjacent pair thereof by a sintering process.

Referring to FIG. 3, the first internal electrode 121 may be formed on the dielectric layer 111. The first internal electrode 121 may not be formed entirely in the longitudinal direction of the dielectric layer. For example, one end of each first internal electrode 121 may be formed at a predetermined interval (e.g., spaced apart by the predetermined interval) from the fourth surface 4 of the ceramic body, and the other end of the first internal electrode 121 (e.g., the end opposite the one end) may be formed up to the third surface 3 and exposed through the third surface 3.

End portions of the first internal electrode 121 exposed through the third surface 3 of the ceramic body may be connected to the first external electrode 131.

In a different manner to the first internal electrode, one end of each second internal electrode 122 may be formed at a predetermined interval (e.g., spaced apart by the predetermined interval) from the third surface 3, and the other end of the second internal electrode 122 (e.g., the end opposite the one end) may be exposed through the fourth surface 4 and connected to the second external electrode 132.

The internal electrodes may be laminated in 400 layers or more for the implementation of a high-capacitance multilayer ceramic capacitor, but are not limited thereto.

Each dielectric layer 111 may have a width equal to a width of the first internal electrode(s) 121. For example, the first internal electrode(s) 121 may be formed overall in the width direction of the dielectric layer(s) 111.

According to an exemplary embodiment of the present disclosure, the width of the dielectric layer(s) 111 and the width of the internal electrode(s) 121 and 122 may be 100 µm to 900 µm, but are not limited thereto. In particular, the width of the dielectric layer(s) and the width of the internal electrode(s) may be 100 µm to 500 µm, or 100 µm to 900 µm.

As the ceramic body is miniaturized, the thickness of the side margin portion 112 and 113 may affect the electrical characteristics of the multilayer ceramic capacitor. According to an exemplary embodiment of the present disclosure, the thickness of the side margin portion may be formed to be 15 µm or less, to improve the characteristics of the miniaturized multilayer ceramic capacitor.

For example, since the side margin portion may be formed to have a thickness of 15 µm or less, a high-capacitance and a miniaturized multilayer ceramic capacitor may be realized by maximally ensuring an overlapping region of the internal electrodes forming the capacitance.

The ceramic body 110 may include an active portion serving as a portion contributing to capacitance formation of the capacitor, and upper and lower cover portions respectively formed on upper and lower surfaces of the active portion, as upper and lower margin portions.

The active portion may be formed by repeatedly laminating a plurality of the first and second internal electrodes 121 and 122 with the dielectric layer 111 interposed therebetween.

The upper and lower cover portions may have the same material and configuration as the dielectric layer 111, except that they do not include internal electrodes. For example, the upper and lower cover portions may respectively extend above an uppermost internal electrode and below a lowermost internal electrode of the capacitor body.

For example, the upper and lower cover portions may include a ceramic material, for example, a barium titanate ($BaTiO_3$)-based ceramic material.

Each of the upper and lower cover portions may have a thickness of 20 µm or less, but is not limited thereto.

In an exemplary embodiment of the present disclosure, the internal electrode(s) and the dielectric layer(s) may be simultaneously cut off, and the width of the internal electrode(s) and the width of the dielectric layer(s) may thereby be formed to be the same. More specific details thereof will be described later.

The width of the dielectric layer (s) may be formed to be equal to the width of the internal electrode(s). Therefore, the ends of the internal electrodes 121 and 122 may be exposed through the first and second surfaces 1 and 2 of the ceramic body 110 opposite each other in the width direction.

The first side margin portion 112 and the second side margin portion 113 may be respectively formed on opposing side surfaces of the ceramic body 110 through which the ends of the internal electrodes 121 and 122 are exposed.

The thickness of each of the first side margin portion 112 and the second side margin portion 113 may be 15 µm or less. The smaller the thickness of each of the first side margin portion 112 and the second side margin portion 113, the larger the overlapping region of the internal electrodes formed in the ceramic body.

The thicknesses of the first side margin portion 112 and the second side margin portion 113 are not particularly limited as long as they have a thickness that may prevent short-circuiting of the internal electrode (s) exposed through the side surface of the ceramic body 110. For example, the thickness of each of the first side margin portion 112 and the second side margin portion 113 may be 2 µm or more.

When the thickness of each of the first and second side margin portions is less than 2 µm, the mechanical strength against external impacts may be lowered. When the thickness of each of the first and second side margin portions exceeds 15 µm, the overlapping region of the internal electrodes may be relatively reduced, and it may be difficult to secure a high-capacitance of the multilayer ceramic capacitor.

In order to maximize the capacitance of the multilayer ceramic capacitor, a method of thinning the dielectric layer, a method of laminating a thinned dielectric layer in a relatively high density, a method of improving coverage of internal electrodes, and the like, have been considered.

Further, a method of improving overlapping region of internal electrodes forming capacitance has been considered.

In order to increase the overlapping region of the internal electrodes, a region of a margin portion in which the internal electrodes are not formed should be minimized.

Particularly, in order to increase the overlapping region of the internal electrodes, as the multilayer ceramic capacitor is miniaturized, the region of the margin portion should be minimized.

According to an exemplary embodiment, it may be characterized in that each internal electrode is formed on the entirety of the dielectric layer in the width direction, the thickness of the side margin portion is set to be 15 µm or less, and the overlapping region of the internal electrodes is relatively large.

Generally, the thickness of each of the dielectric layer(s) and the internal electrode(s) becomes thinner, as the dielectric layers are laminated in a relatively highly density manner. Accordingly, a phenomenon that the internal electrodes are short-circuited may occur frequently. In addition, when the internal electrodes are formed only in a portion of the dielectric layer, a step difference due to the internal electrodes may occur to deteriorate lifespan and reliability in the insulation resistance.

According to an exemplary embodiment, however, as the internal electrodes may be entirely formed on the dielectric layer in the width direction even when internal electrodes and a dielectric layer of a thin film are formed, the overlapping region of the internal electrodes becomes large, thereby increasing the capacitance of the multilayer ceramic capacitor.

In addition, a multilayer ceramic capacitor having improved reliability and excellent capacitance characteristics may be provided by reducing the step difference due to the internal electrode to improve the accelerated lifespan in insulation resistance.

According to an exemplary embodiment, the first and second side margins 112 and 113 contain tin (Sn), and an amount of Sn included in the first and second side margins 112 and 113 is greater than that included in the dielectric layer 111 of the active portion.

Moisture-resistance reliability may be improved by adjusting the first and second side margins 112 and 113 to contain Sn and adjusting the amount of Sn included in the first and second side margins 112 and 113 to be greater than that included in the dielectric layer 111 of the active portion.

In particular, according to an exemplary embodiment, the dielectric layer 111 of the active portion may contain no or an infinitesimal amount of Sn.

In contrast, to improve moisture resistance reliability and provide the first and second side margins 112 and 113 impact resistance and crack resistance, the amount of Sn included in the first and second side margins 112 and 113 is adjusted to be greater than that included in the dielectric layer 111 of the active portion.

When the amount of Sn included in the first and second side margins 112 and 113 is adjusted to be greater than that included in the dielectric layer 111 of the active portion, the size of a dielectric grain included in the first and second side margins 112 and 113 can be controlled to be smaller than that included in the dielectric layer 111 of the active portion, thereby endowing high toughness to the first and second side margins 112 and 113, as compared to the dielectric layer 111 of the active portion.

Accordingly, occurrence of cracking of the first and second side margins 112 and 113 can be reduced when mounting the multilayer ceramic capacitor on a substrate.

In the case of a conventional multilayer ceramic capacitor, internal electrodes overlap each other in the active region producing capacitance. When manufacturing a ceramic body including margin portions, the margin portions are regions in which the internal electrodes are not formed. In general, the margin portions are formed using ceramic green sheets having the same dielectric composition as those used in the active region. In this regard, it is common that the dielectric composition of the active region and that of the margin portions are the same.

In the case of such a conventional multilayer ceramic capacitor, a ceramic body including active regions and margin portions are manufactured by laminating ceramic green sheets having the same dielectric composition, which gives rise to a structure in which different dielectric compositions cannot be applied to the two regions.

To accomplish a miniaturized and high capacitance multilayer ceramic capacitor as in an exemplary embodiment of the present disclosure, a manufacturing method includes exposing the internal electrodes in the width direction of the body to maximize an area of the internal electrodes in the width direction through a design without a margin, and separately attaching a side margin portion to the exposed surface of the electrode in the width direction of the chip during pre-sintering and after chip preparation.

When manufacturing a multilayer ceramic capacitor as previously described, however, a dielectric layer for forming a side margin portion was conventionally not differentiated from that of the ceramic body, and the dielectric composition of the ceramic body was used as it was.

Conventionally, the dielectric composition of the ceramic body was used as it was and was not differentiated from that of the dielectric composition for side margin portion formation, and thus, the dielectric compositions of both regions were the same and were not applied differently.

According to an exemplary embodiment, however, the dielectric composition included in the first and second margin portions 112 and 113 and that of the dielectric layer 111 of the active portion are different, and the amount of Sn included in the first and second margin portions 112 and 113 is greater than that included in the dielectric layer 111 of the active portion.

The dielectric ceramic composition included in the first and second side margin portions 112 and 113 and the dielectric layer 111 of the active portion may include a main ingredient including Ba and Ti.

The major component may include $BaTiO_3$ or a major component represented as $(Ba,Ca)(Ti,Ca)O_3$, $(Ba,Ca)(Ti,Zr)O_3$, $Ba(Ti,Zr)O_3$, $(Ba,Ca)(Ti,Sn)O_3$, in which Ca, Zr, Sn, or the like, is partially contained. The major component may be included in the form of powder.

According to an exemplary embodiment, the first and second side margin portions 112 and 113 may further contain Sn in addition to the major components including Ba and Ti.

The amount of Sn included in the first and second side margin portions 112 and 113 may be 0.1 mol to 3.0 mol, based on 100 mol of barium titanate ($BaTiO_3$), a main component of the first and second margin portions.

By adjusting the Sn amount included in the first and second side margin portions 112 and 113 to be 0.1 mol to 3.0 mol, based on 100 mol of $BaTiO_3$ included in the first and second margin portions, the moisture resistance reliability may be improved.

Further, the first and second side margin portions 112 and 113 may have higher toughness compared to the dielectric layer 111 of the active portion, thereby reducing the incidence of cracking of the first and second side margin portions 112 and 113 when mounting the multilayer ceramic capacitor on a substrate When the Sn amount included in the first and second side margin portions 112 and 113 is less than 0.1 mol, based on 100 mol of $BaTiO_3$ included in the first and second margin portions, occurrence of breakage and cracking, which are caused by external impacts, may increase due to the small amount of Sn.

In contrast, when the Sn amount included in the first and second side margin portions 112 and 113 is greater than 3.0 mol, a network is formed between Sn, thereby giving rise to deteriorated impact resistance.

Additionally, conventional multilayer ceramic capacitors may suffer from low moisture resistance reliability.

According to an exemplary embodiment, the Sn amount included in the first and second margin portions may be 0.25 mol to 3.0 mol, based on 100 mol of $BaTiO_3$ included in the first and second margin portions.

When the Sn amount included in the first and second margin portions is adjusted to be 0.25 mol to 3.0 mol, based on 100 mol of $BaTiO_3$ included in the first and second margin portions, moisture resistance reliability as well as impact resistance and crack resistance may be excellent.

When the Sn amount included in the first and second side margin portions 112 and 113 is less than 0.25 mol, based on 100 mol of $BaTiO_3$ included in the first and second margin portions, the first and second side margin portions 112 and 113 cannot have high toughness and good moisture resistance reliability, thereby leading to cracking and other defects.

According to an exemplary embodiment, the amount of tin (Sn) included in the dielectric layer of the active portion may be less than 0.1 mol, based on 100 mol of $BaTiO_3$ included in the dielectric layer 111 of the active portion.

In particular, according to an exemplary embodiment, the dielectric layer 111 of the active portion may contain no or an infinitesimal amount of Sn.

Meanwhile, according to an exemplary embodiment, a size of a dielectric grain included in the first and second margin portions 112 and 113 may be smaller than that of a dielectric grain included in the dielectric layer 111 of the active portion.

When the Sn amount included in the first and second side margin portions 112 and 113 is adjusted to be greater than that included in the dielectric layer 111 of the active portion, the size of the dielectric grains included in the first and second margin portions 112 and 113 may be adjusted to be smaller than that of the dielectric grain included in the dielectric layer 111 of the active portion, thereby providing high toughness to the first and second side margin portions 112 and 113 compared to the dielectric layer 111 of the active portion.

Accordingly, occurrence of cracking of the first and second side margins 112 and 113 can be reduced when mounting the multilayer ceramic capacitor on a substrate.

Specifically, the size of the dielectric grain included in the first and second margin portions 112 and 113 may be 90 nm to 700 nm.

More preferably, the size of the dielectric grain included in the first and second margin portions 112 and 113 may be 100 nm to 410 nm.

In other words, according to an exemplary embodiment, the size of the dielectric grain included in the first and second margin portions 112 and 113 is adjusted to be 90 nm to 700 nm, preferably 100 m to 410 nm, to have high toughness compared to the dielectric layer 111 of the active portion.

The size of the dielectric grains included in the dielectric layer 111 of the active portion is the same as that included in dielectric layers of a conventional multilayer ceramic capacitor, and may be for example 300 nm to 900 nm, but is not limited thereto.

In particular, according to an exemplary embodiment, as the Sn amount included in the first and second side margin portions 112 and 113 increases, the size of the dielectric grains may decrease toward the internal region close to the internal electrode at an external interface of the side margin portion.

That is, Sn decreases a diameter of the dielectric grains in the first and second side margin portions 112 and 113 and further decreases the dielectric grain size in the internal region close to the internal electrodes so that the side margin portions can have high toughness.

The sizes of the dielectric grains included in the first and second side margins 112 and 113 may be obtained by measuring lengths in major axis and minor axis of the dielectric grains extracted from the respective regions to calculate an average size thereof.

When shapes of the dielectric grains are assumed to be elliptical, the length in major axis of the dielectric grains may correspond to a particle size of the dielectric grains at a point measured the longest, among various points measured as sizes of the dielectric grains, and the length in minor axis of the dielectric grains may correspond to a particle size of the dielectric grains at a point measured the shortest, among various points measured as sizes of the dielectric grains.

In the following Table 1, a number of pores of the side margin portions and sizes of dielectric grains in the internal and external sides of the side margin portions are shown according to the amount of Sn included in the first and second margin portions 112 and 113.

TABLE 1

| | Sn amount (mol) | No. of pores | Size of dielectric grain inside of side margin portions (nm) | Size of dielectric grain outside of side margin portions (nm) | Reliability |
|---|---|---|---|---|---|
| 1* | 0.00 | 22 | 495 | 248 | X |
| 2 | 0.10 | 24 | 215 | 227 | ○ |
| 3 | 0.25 | 29 | 195 | 176 | ○ |
| 4 | 1.00 | 21 | 231 | 243 | ○ |
| 5 | 2.50 | 12 | 217 | 326 | ○ |
| 6* | 3.50 | 73 | 199 | 149 | X |

*Comparative Example

Sample 1 is a Comparative Example, a conventional case in which the margin portion does not contain Sn, and shows that the dielectric grain inside the side margin portion is large and that multiple defects are observed in moisture resistance reliability, impact resistance, and crack resistance tests.

Samples 2 to 5, satisfying the range of the Sn amount included in the first and second side margin portions 112 and 113 of the present disclosure, are Examples of the present disclosure, and show satisfying moisture resistance reliability, impact resistance, and crack resistance due to small dielectric grain inside the side margin portions.

In contrast, Sample 6, a Comparative Example in which an excessive amount of Sn is included in the first and second side margin portions, has an issue with moisture resistance reliability due to a large number of pores. In addition, impact resistance was deteriorated due to network formation between Sn.

According to an exemplary embodiment, the dielectric layer 111 of a miniaturized multilayer ceramic capacitor may have a thickness of 0.4 μm or less and the internal electrodes 121 and 122 thereof may have a thickness of 0.4 μm or less.

As in an exemplary embodiment, in the case to which a thin film dielectric layer 111 having a thickness of 0.4 μm or less and the internal electrodes 121 and 122 having a thickness of 0.4 μm or less are applied, reliability becomes a critical issue according to reduced moisture resistance reliability and cracking.

In other words, in the case of a conventional multilayer ceramic capacitor, the reliability was not an issue even without adjusting the size of the dielectric grain of the side margin portions, which a multilayer ceramic capacitor according to an exemplary embodiment of the present disclosure includes.

However, as for products to which thin film dielectric layers and internal electrodes are applied as in an exemplary embodiment of the present disclosure, the size of the dielectric grains included in the side margin portions needs to be adjusted to prevent deterioration of moisture resistance and occurrence of cracking.

That is, when the Sn amount included in the first and second margin portions 112 and 113 is adjusted to be greater than that included in the dielectric layers 111 of the active portion, the size of the dielectric grains included in the first and second margin portions 112 and 113 can be adjusted to be smaller than that included in the dielectric layers 111 of the active portion, thereby giving rise to higher toughness of the first and second margin portions 112 and 113 than that of the dielectric layers 111 of the active portion.

In this regard, occurrence of cracking of the first and second side margins 112 and 113 can be reduced when mounting the multilayer ceramic capacitor on a substrate.

In an exemplary embodiment, the size of the dielectric grains included in the first and second margin portions can be adjusted to be smaller than that of dielectric grains included in the dielectric layers 111 of the active portion. This facilitates improvement of moisture resistance reliability even in a case of the thin film, of which the thicknesses of the dielectric layers 111 and the first and second internal electrodes 121 and 122 are 0.4 µm or less.

However, the expression "thin film" does not require a film having a thickness is 0.4 µm or less, but can more generally be understood as having thinner dielectric layers and internal electrodes than conventional ones.

FIGS. 5A to 5F are cross-sectional views and a perspective view schematically illustrating a method for manufacturing a multilayer ceramic capacitor according to another exemplary embodiment.

According to another exemplary embodiment, a method of manufacturing a multilayer ceramic capacitor includes preparing first ceramic green sheets each having a plurality of first internal electrode patterns formed at a predetermined interval, and second ceramic green sheets each having a plurality of second internal electrode patterns formed at a predetermined interval; forming a ceramic green sheet laminated body by stacking and laminating the first ceramic green sheets and the second ceramic green sheets such that the first internal electrode patterns and the second internal electrode patterns overlap each other in the stacking direction; cutting the ceramic green sheet laminated body so as to have a side surface to which ends of the first internal electrode patterns and the second internal electrode patterns are exposed in a width direction; forming a first side margin portion and a second side margin portion on respective opposing side surfaces to which both the first internal electrode patterns and the second internal electrode patterns are exposed; and sintering the cut laminated body to prepare a ceramic body including dielectric layers and first and second internal electrodes, wherein the ceramic body includes an active portion including a plurality of the internal electrodes arranged to overlap each other with the dielectric layers interposed therebetween to form capacitance, and cover portions formed on upper and lower portions of the active portion, and the first and second side margin portions include tin (Sn), and an amount of Sn included in the first and second side margin portions is greater than an amount of Sn included in the dielectric layers of the active portion.

Hereinafter, a method for manufacturing a multilayer ceramic capacitor according to another exemplary embodiment will be described.

Figure 5A:
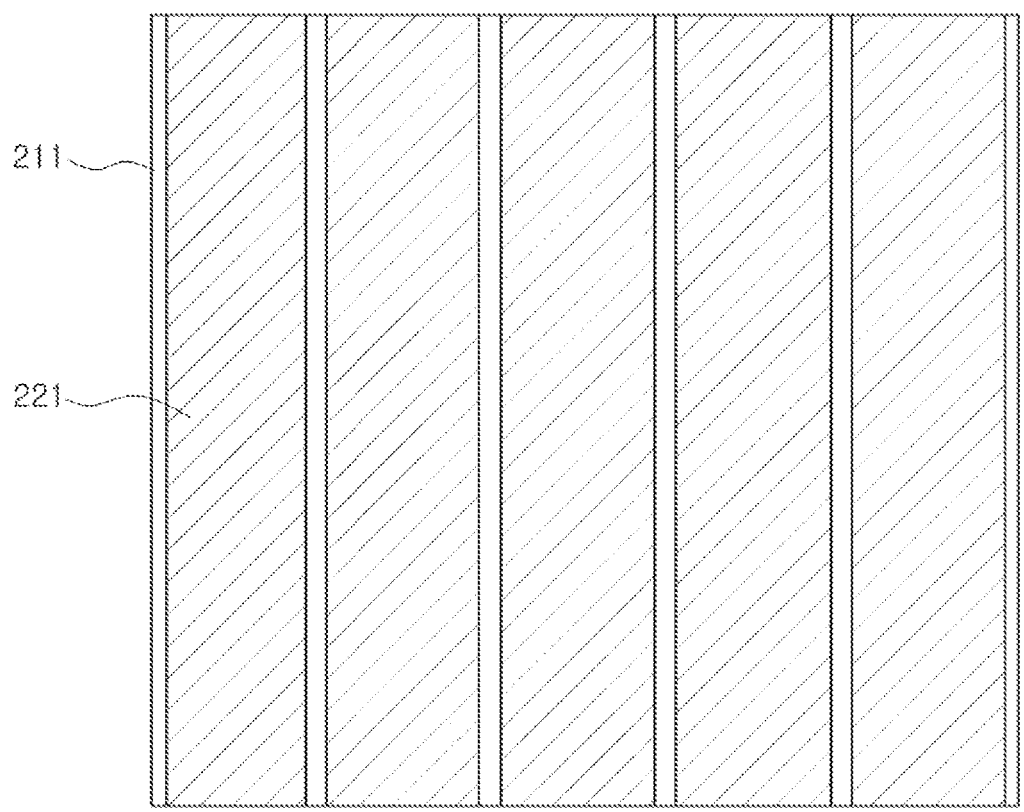
FIGS. 5A to 5F are cross-sectional views and a perspective view schematically illustrating a method for manufacturing a multilayer ceramic capacitor according to another exemplary embodiment.

As illustrated in FIG. 5A, a plurality of first internal electrode patterns 221 in a stripe form are formed on a ceramic green sheet 211 at a predetermined interval. A plurality of the stripe-shaped first internal electrode patterns 221 may be formed in parallel with each other on the ceramic green sheet 211.

The ceramic green sheet 211 may be formed as a ceramic paste containing ceramic powder, an organic solvent, and an organic binder.

The ceramic powder particles may be a material having a high dielectric constant, but are not limited thereto. Examples thereof may include a barium titanate (BaTiO$_3$)-based material, a lead composite perovskite-based material, a strontium titanate (SrTiO$_3$)-based material, or the like. The BaTiO$_3$-based powder particle may preferably be used. When sintered, the ceramic green sheet 211 becomes a dielectric layer 111 constituting a ceramic body 110.

The stripe-shaped first internal electrode pattern 221 may be formed of an internal electrode paste containing a conductive metal. The conductive metal may be nickel (Ni), copper (Cu), palladium (Pd), or alloys thereof, but is not limited thereto.

A method of forming the stripe-shaped first internal electrode patterns 221 on the ceramic green sheet 211 is not particularly limited, but may involve a printing method such as a screen-printing method or a gravure printing method.

Although not illustrated, a plurality of stripe-shaped second internal electrode patterns 222 may be formed on one or more other ceramic green sheets 211 at a predetermined interval.

Hereinafter, a ceramic green sheet on which the first internal electrode patterns 221 are formed may be referred to as a first ceramic green sheet, and a ceramic green sheet on which the second internal electrode patterns 222 are formed may be referred to as a second ceramic green sheet.

Figure 5B:
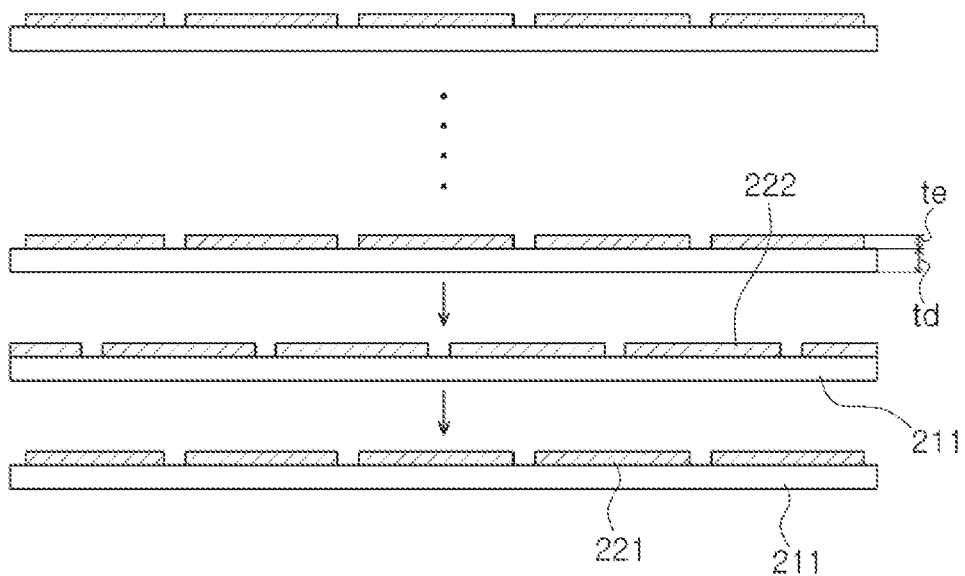

As illustrated in FIG. 5B, the first and second ceramic green sheets may be alternately stacked and laminated to alternately laminate the stripe-shaped first internal electrode patterns 221 and second internal electrode patterns 222.

The stripe-type first internal electrode pattern(s) 221 may become first internal electrode(s) 121, and the stripe-type second internal electrode pattern(s) 222 may become a second internal electrode(s) 122.

According to another embodiment, a thickness (td) of each of the first and second ceramic green sheets may be 0.6 µm or less, and a thickness (te) of each of the first and second internal electrode patterns may be 0.5 µm or less.

As a miniaturized and high capacitance multilayer ceramic capacitor of the present disclosure has a dielectric layer having a thickness of 0.4 µm or less and internal electrodes having a thickness of 0.4 µm or less, the thickness (td) of each of the first and second ceramic green sheets is 0.6 µm or less, and the thickness (te) of each of the first and second internal electrode patterns is 0.5 µm or less.

Figure 5C:
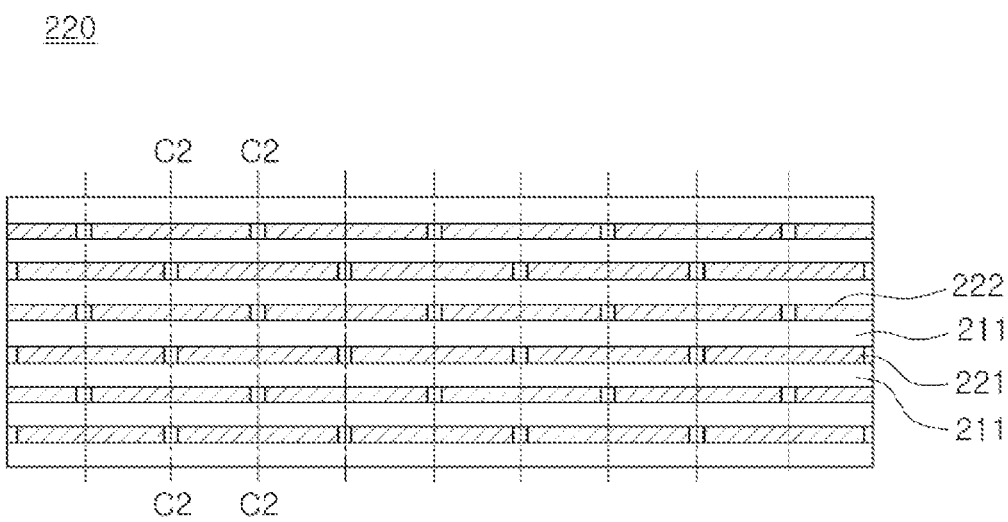
Figure 5D:
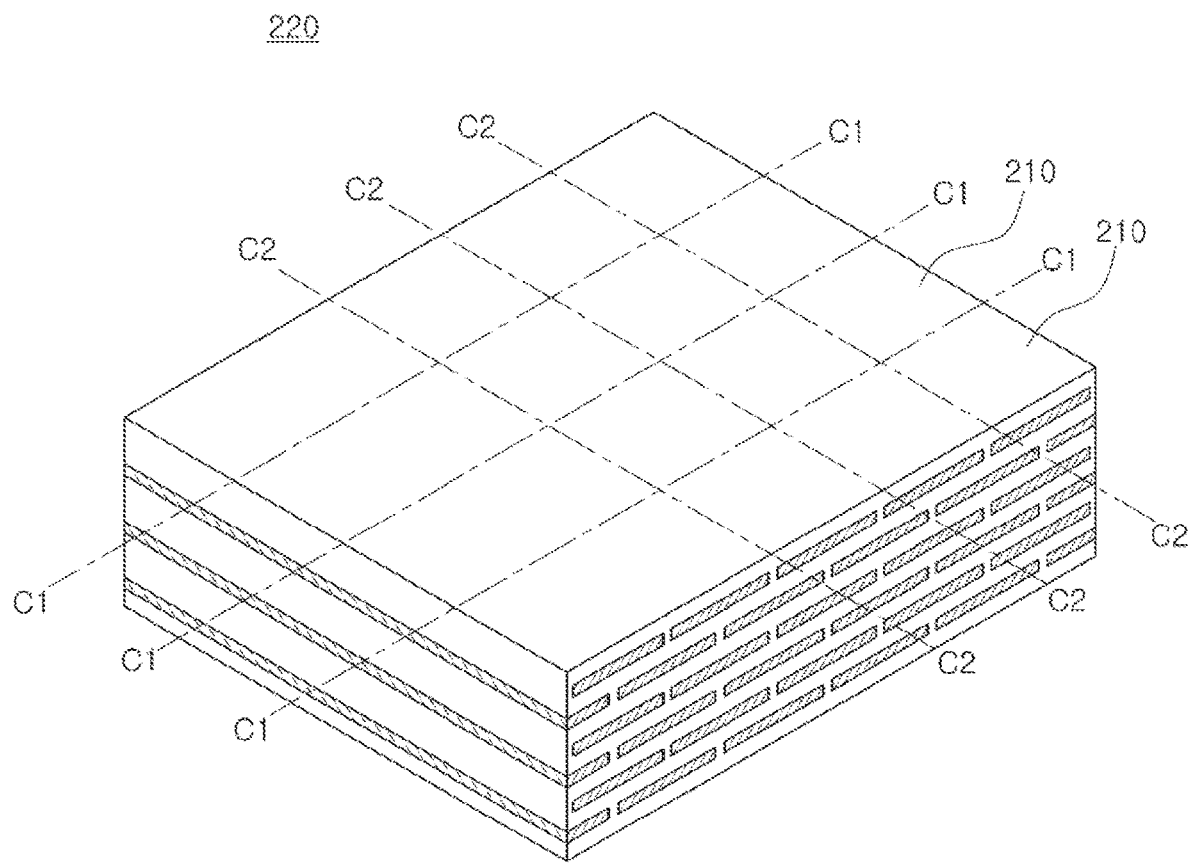

FIG. 5C is a cross-sectional view illustrating a ceramic green sheet laminated body 220 in which first and second ceramic green sheets are laminated according to an exemplary embodiment of the present disclosure, and FIG. 5D is a perspective view illustrating a ceramic green sheet laminated body 220 in which first and second ceramic green sheets are laminated.

Referring to FIGS. 5C and 5D, a first ceramic green sheet on which a plurality of parallel stripe-type first internal electrode patterns 221 are printed and a second ceramic green sheet on which a plurality of parallel stripe-type second internal electrode patterns 222 are printed may be laminated alternately.

More specifically, the first and second ceramic green sheets may be laminated such that a central portion of the stripe-shaped first internal electrode pattern 221 printed on the first ceramic green sheet and the stripe-shaped second internal electrode patterns 222 printed on the second ceramic green sheet overlap.

As illustrated in FIG. 5D, the ceramic green sheet laminated body 220 may be cut so as to cross a plurality of the stripe-shaped first and second internal electrode patterns 221 and 222. For example, the ceramic green sheet laminated body 210 may become a laminated body 210 cut along cutting lines C1-C1 and C2-C2, orthogonal to each other.

In particular, the stripe-shaped first internal electrode patterns 221 and the stripe-shaped second internal electrode patterns 222 may be divided into a plurality of internal electrodes that are cut in a longitudinal direction and have a same width. In this case, the laminated ceramic green sheet may be also cut together with the internal electrode pattern. Accordingly, the dielectric layer may be formed to have the same width as the internal electrodes.

The stripe-shaped first and second internal electrode patterns 221 and 222 may also be cut in conformity with individual ceramic body sizes along cutting lines C2-C2. For example, prior to forming the first side margin portion and the second side margin portion, a number of the laminated bodies 210 may be formed by cutting a rod-shaped laminated body into individual ceramic body sizes along cutting lines C2-C2.

For example, the rod-shaped laminated body may be cut by a cutting line such that the predetermined space between the central portion of the first internal electrode and the second internal electrode are equally cut. Accordingly, one end of each of the first internal electrodes and one end of each of the second internal electrode may be exposed through respective cut surfaces.

The first side margin portion and the second side margin portion may then be formed on the first and second side surfaces of the laminated body 210, respectively.

Figure 5E:
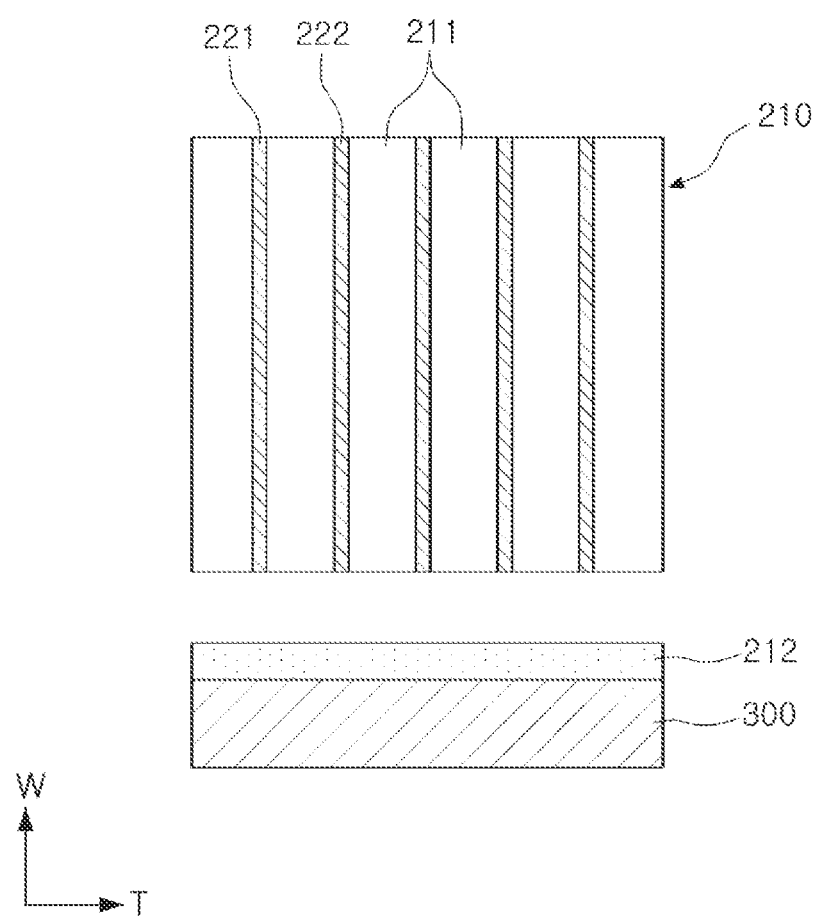

As illustrated in FIG. 5E, a first side margin portion 212 may be formed on the first side surface of the laminated body 210.

Specifically, a method of forming the first side margin portion 212 involves disposing a ceramic green sheet for a side surface on a punching elastic material 300 of a rubber material.

The laminated body 210 may then be rotated 90 degrees such that the first side surface of the laminated body 210 faces the ceramic green sheet for the side surface, and then the laminated body 210 may be pressed tightly against the ceramic green sheet for the side surface.

When the laminated body 210 is pressed against the ceramic green sheet for the side surface to transfer the ceramic green sheet for the side surface to the laminated body 210, the ceramic green sheet for the side surface may be formed up to a side edge portion of the laminated body 210, and the remaining portion may be cut, due to the punching elastic material 300 of the rubber material.

Figure 5F:
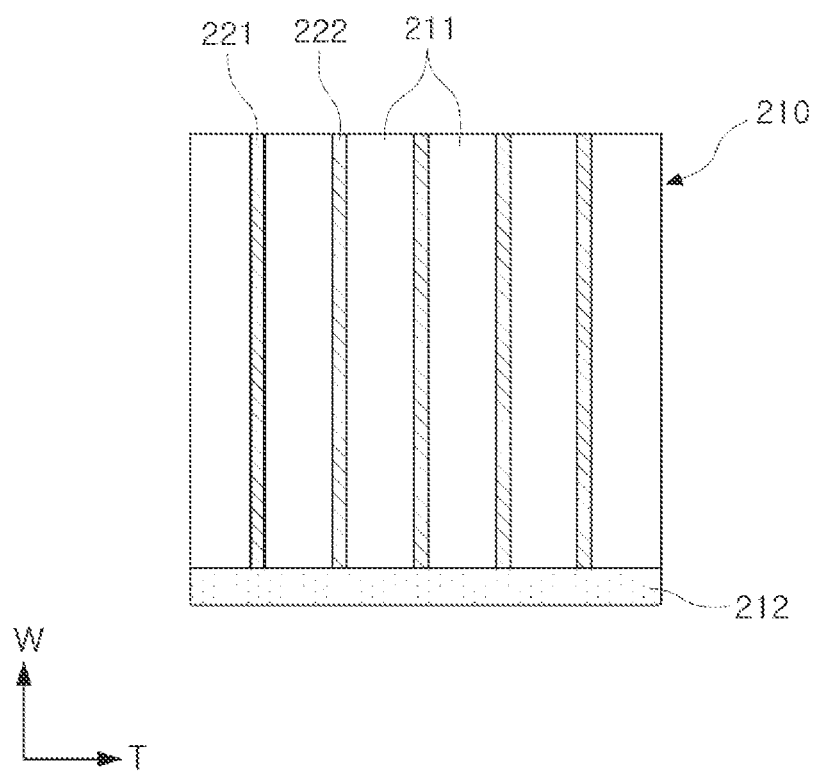

Accordingly, as illustrated in FIG. 5F, the first side margin portion 212 may be formed on the first side surface of the laminated body 210.

A second side margin portion may be formed on the second side surface of the laminated body 210 by rotating the laminated body 210.

A ceramic body including the dielectric layers and the first and second internal electrodes may be formed by calcining and sintering the laminated body in which the first and second side margin portions are formed on both side surfaces.

External electrodes may be formed on a third side surface of the ceramic body on which first internal electrodes are exposed, and on a fourth side surface of the ceramic body on which second internal electrodes are exposed.

According to another exemplary embodiment, the ceramic green sheets for the side surface are relatively thin, and deviation in thickness is relatively small, thereby enabling to secure a relatively large size of a capacitance-forming portion.

Specifically, as an average thickness of the first and second side margin portions 112 and 113 is 2 μm to 15 μm and the deviation in thickness of the first and second side margin portions 112 and 113 is relatively small after the sintering, a relatively large size of a capacitance-forming portion can be secured.

This facilitates achievement of a high capacitance multilayer ceramic capacitor.

In addition, the first and second side margin portions 112 and 113 may further contain Sn in addition to the major components including barium (Ba) and titanium (Ti).

The amount of Sn included in the first and second side margin portions 112 and 113 may be 0.1 mol to 3.0 mol, based on 100 mol of $BaTiO_3$, a main component of the first and second margin portions.

By adjusting the amount of Sn included in the first and second side margin portions 112 and 113 to be 0.1 mol to 3.0 mol, based on 100 mol of $BaTiO_3$ included in the first and second margin portions, the moisture resistance reliability may be improved.

The description of the same features as those of the above exemplary embodiment of the present disclosure will be omitted here to avoid redundancy.

Hereinafter, the present disclosure will be described in more detail with reference to Experimental Examples. Such Experimental Examples may provide specific understanding of the present disclosure, and the present disclosure is not limited by Experimental Examples.

Experimental Examples

According to an exemplary embodiment of the present disclosure, Comparative Examples in which side margin portions are formed to have a dielectric composition excluding tin such as in a conventional side margin portion and Examples in which side margin portions are formed to have a dielectric composition including tin were prepared.

A ceramic green sheet laminated body was formed by attaching a ceramic green sheet for a side surface, as in the above-described Comparative Examples and Examples, to an electrode exposed portion of a green chip from which internal electrodes were exposed in a width direction, to form a side margin portion.

A ceramic green sheet for a side surface was attached to both side surfaces of the ceramic green sheet laminated body, by applying a constant temperature and pressure thereto under a condition of minimizing deformation of the chip, to prepare a multilayer ceramic capacitor green chip having a size of 0603 (width×length×height: 0.6 mm×0.3 mm×0.3 mm).

The multilayer ceramic capacitor samples thus prepared were subjected to a calcination treatment under a nitrogen atmosphere at a temperature of 400° C. or less, were sintered under the conditions of a sintering temperature of 1200° C. or less and a $H_2$ concentration of 0.5% or less, and were confirmed with respect to electric characteristics such as appearance defects, insulation resistance, moisture resistance, and the like.

Figure 6:
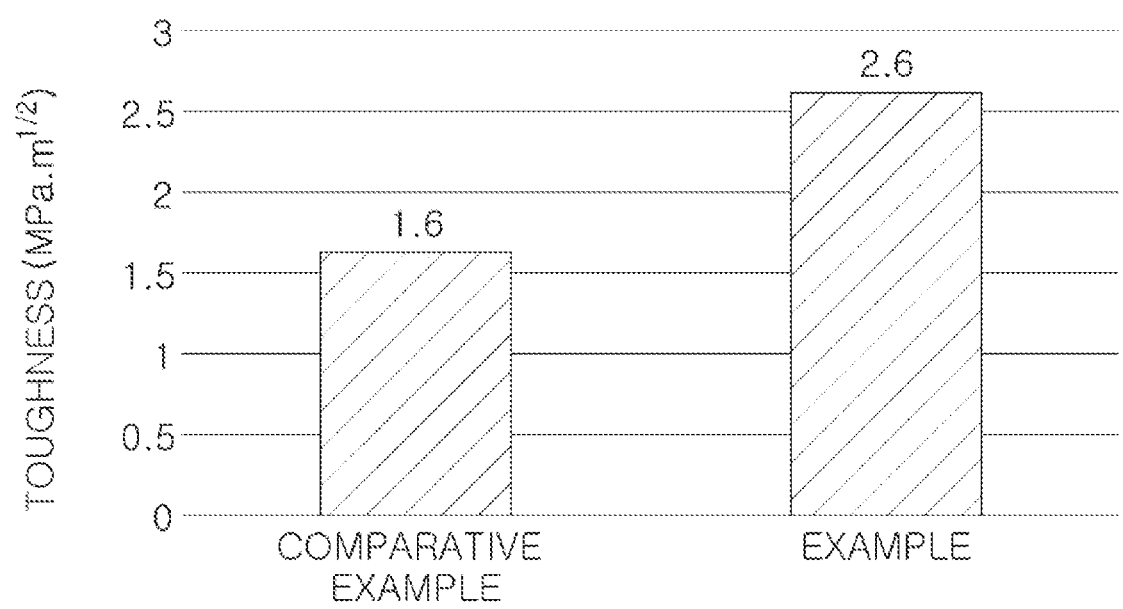
FIG. 6 is a graph showing measurements of toughness of side margin portions according to the Examples of the present disclosure and Comparative Examples.

FIG. 6 is a graph showing measurements of toughness of side margin portions according to the Examples of the present disclosure and Comparative Examples.

Based on FIG. 6, compared to the Comparative Examples in which the side margin portions are formed to have a dielectric composition excluding Sn, the Examples in which the side margin portions are formed to have a dielectric composition including Sn have higher toughness.

Figure 7A:
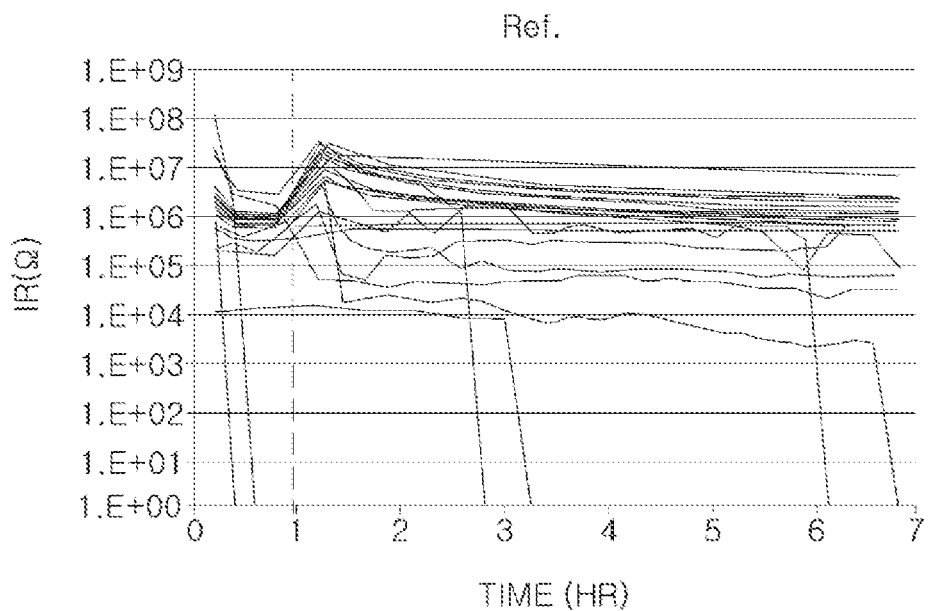
FIGS. 7A and 7B are graphs showing comparison of results of moisture resistance reliability tests according to the Examples and Comparative Examples.
Figure 7B:
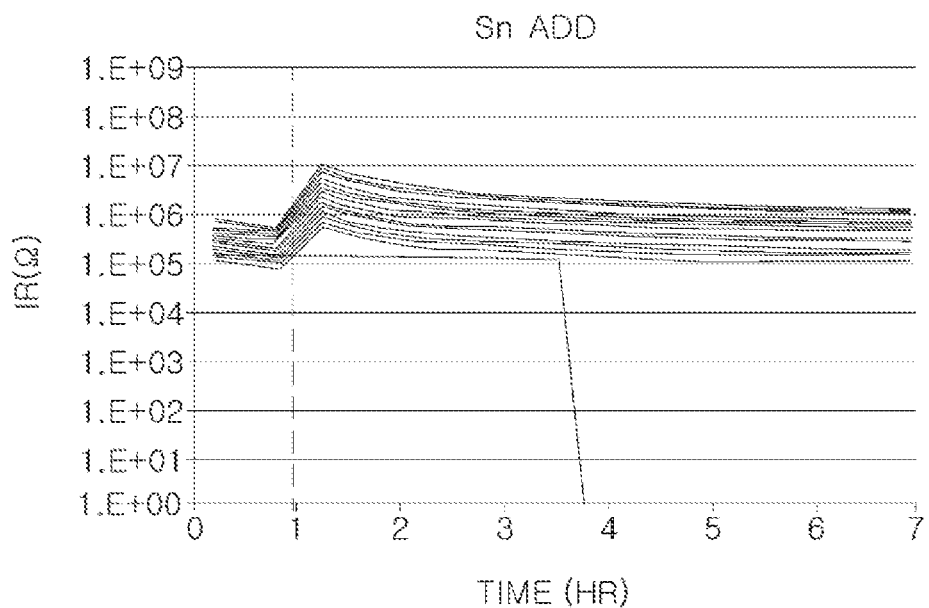

FIGS. 7A and 7B are graphs showing comparison of results of moisture resistance reliability tests according to the Examples and Comparative Examples.

FIG. 7A illustrates the Comparative Examples in which is the side margin portions have the dielectric composition excluding Sn as in conventional devices, and FIG. 7B illustrates the Examples in which the side margin portions have the dielectric composition including Sn.

It can be seen that the Comparative Examples had a problem of low reliability in moisture resistance, whereas the Examples had excellent reliability in moisture resistance.

According to an exemplary embodiment of the present disclosure, the amount of Sn included in the first and second side margin portions is adjusted to be greater than that included in the dielectric layers of the active portion, thereby improving moisture resistance reliability.

In addition, when the amount of Sn included in the first and second side margin portions is adjusted to be greater than that included in the dielectric layers of the active portion, the size of a dielectric grains included in the first and second side margin portions can be adjusted to be smaller than that included in the dielectric layers of the active portion, thereby allowing the first and second side margin portions to have higher toughness compared to the dielectric layer of the active portion.

This may lead to ameliorate cracking of the first and second side margin portions.

While example embodiments have been illustrated and described above, it will be apparent to those skilled in the art that modifications and deviations could be made without departing from the scope of the present disclosure as defined by the appended claims.

What is claimed is:

1. A multilayer ceramic capacitor, comprising:
a ceramic body comprising a dielectric layer, and a first surface and a second surface opposing each other, a third surface and a fourth surface connecting the first and second surfaces, and a fifth surface and a sixth surface connected to the first to fourth surfaces and opposing each other;
a plurality of internal electrodes disposed in the ceramic body, exposed on the first and second surfaces, and each having one end exposed through one of the third surface or the fourth surface; and
a first side margin portion and a second side margin portion arranged on end portions of the internal electrodes exposed through the first and second surfaces, respectively,
wherein the ceramic body comprises an active portion comprising the plurality of internal electrodes arranged to overlap each other with the dielectric layer interposed therebetween to form capacitance, and cover portions disposed above an uppermost internal electrode and below a lowermost internal electrode of the active portion,
the content of tin (Sn) included in the first and second margin portions is 0.1 mol to 3.0 mol, based on 100 mol of barium titanate ($BaTiO_3$) in the first and second margin portions, and
the content of tin (Sn) included in the dielectric layer of the active portion is less than 0.1 mol, based on 100 mol of barium titanate ($BaTiO_3$) in dielectric layer of the active portion.

2. The multilayer ceramic capacitor of claim 1, wherein the content of tin (Sn) included in the first and second margin portions is 0.25 mol to 3.0 mol, based on 100 mol of barium titanate ($BaTiO_3$) in the first and second margin portions.

3. The multilayer ceramic capacitor of claim 1, wherein an average size of dielectric grains included in the first and second margin portions is smaller than an average size of dielectric grains included in the dielectric layer of the active portion.

4. The multilayer ceramic capacitor of claim 1, wherein the average size of the dielectric grains included in the first and second margin portions is 90 nm to 700 nm.

5. The multilayer ceramic capacitor of claim 1, wherein the average size of the dielectric grains included in the first and second margin portions is 100 nm to 410 nm.

6. The multilayer ceramic capacitor of claim 1, wherein a thickness of the dielectric layer between each pair of adjacent internal electrodes of the plurality of internal electrodes is 0.4 μm or less, and a thickness of the internal electrodes is 0.4 μm or less.

7. The multilayer ceramic capacitor of claim 1, wherein the length of the ceramic body is 400 μm to 1400 μm.

8. The multilayer ceramic capacitor of claim 1, wherein the internal electrodes are laminated in 400 layers or more.

9. The multilayer ceramic capacitor of claim 1, wherein each of the upper and lower cover portions has a thickness of 20 μm or less.

10. The multilayer ceramic capacitor of claim 1, wherein an average thickness of the first and second side margin portions is 2 μm to 15 μm.

11. The multilayer ceramic capacitor of claim 1, wherein a thickness of the dielectric layer between each pair of adjacent internal electrodes of the plurality of internal electrodes is 0.4 μm or less.

12. The multilayer ceramic capacitor of claim 1, wherein a thickness of the internal electrodes is 0.4 μm or less.

* * * * *